(12) United States Patent
Nasir et al.

(10) Patent No.: US 12,006,879 B1
(45) Date of Patent: Jun. 11, 2024

(54) TURBOMACHINE WITH COMPRESSOR DIFFUSER BLEED FOR UNIFORM EXIT FLOW

(71) Applicant: HONEYWELL INTERNATIONAL INC., Charlotte, NC (US)

(72) Inventors: Shakeel Nasir, Phoenix, AZ (US); John McClintic, Phoenix, AZ (US); Jeffrey Krise, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/170,161

(22) Filed: Feb. 16, 2023

(51) Int. Cl.
*F02C 9/18* (2006.01)

(52) U.S. Cl.
CPC ............ *F02C 9/18* (2013.01); *F05D 2220/32* (2013.01); *F05D 2240/35* (2013.01); *F05D 2260/60* (2013.01)

(58) Field of Classification Search
CPC ................. F02C 9/18; F02C 6/08; F02C 7/18
See application file for complete search history.

(56) References Cited

U.S. PATENT DOCUMENTS

| | | | |
|---|---|---|---|
| 4,720,235 A * | 1/1988 | Lachance | F02C 9/18 415/58.1 |
| 5,186,601 A | 2/1993 | Treece et al. | |
| 7,788,931 B2 | 9/2010 | Tatebayashi | |
| 10,208,628 B2 | 2/2019 | Nasir et al. | |
| 10,605,253 B2 | 3/2020 | Hoover et al. | |
| 10,683,802 B2 | 6/2020 | Nithsdale | |
| 11,326,619 B2 | 5/2022 | Rusch et al. | |
| 11,441,438 B2 | 9/2022 | Becker | |
| 2003/0079477 A1 * | 5/2003 | Liu | F01D 5/081 60/782 |
| 2017/0211586 A1 * | 7/2017 | Gage | F04D 29/582 |
| 2017/0248155 A1 * | 8/2017 | Parker | F02C 6/08 |
| 2017/0284226 A1 * | 10/2017 | Nasir | F02C 7/00 |
| 2018/0135516 A1 * | 5/2018 | Nasir | F02C 7/00 |
| 2019/0162197 A1 * | 5/2019 | Hoover | F02C 9/18 |

FOREIGN PATENT DOCUMENTS

| | | |
|---|---|---|
| DE | 102019110834 A1 | 10/2020 |
| FR | 2932250 A1 | 12/2009 |

OTHER PUBLICATIONS

Grimshaw, S.D., "Modelling Non-Uniform Bleed in Axial Compressors," TUROB-16-1024, 2016.

* cited by examiner

*Primary Examiner* — Katheryn A Malatek
(74) *Attorney, Agent, or Firm* — Lorenz & Kopf LLP

(57) ABSTRACT

A bleed arrangement for a turbomachine that results in uniform flow to the combustor. A turbomachine includes a compressor, a combustor disposed to receive the compressed air from the compressor through a flow path, and a diffuser disposed in the flow path between the compressor and the combustor. A number of bleed holes are disposed downstream in the flow path from the diffuser and are configured to direct bleed air compressed by the compressor away from the combustor. The number of bleed holes have a plural number of sizes configured to provide uniform compressor exit flow distribution around a circumference of the diffuser.

20 Claims, 7 Drawing Sheets

TURBOMACHINE WITH COMPRESSOR DIFFUSER BLEED FOR UNIFORM EXIT FLOW

TECHNICAL FIELD

Embodiments of the subject matter described herein generally relate to turbomachinery air flow. More particularly, embodiments of the subject matter relate to the configuration of bleed openings to minimize nonuniformity in deswirl exit flow directed to the combustor.

BACKGROUND

A turbomachine such as a gas turbine engine may be used to power various types of vehicles and/or systems. Gas turbine engines typically include a compressor that receives and compresses incoming gas such as air, a combustor in which the compressed gas is mixed with fuel and burned to produce high-pressure and high-velocity exhaust gas, and one or more turbines that extract energy from the gas exiting the combustor.

Diffusers are employed in compression systems to reduce the velocity of compressed airflow, while increasing static pressure prior to delivery of the airflow into, for example, a combustion section of the gas turbine engine. Diffusers typically contain a plurality of airfoils or vanes, which are arranged in an annular array between two annular plates. Collectively, the vanes and the plates form an annular flowbody with a number of flow passages, which includes inlets distributed along its inner periphery and outlets distributed along outer periphery. Diffuser flow passages or channels connect the diffuser inlets to the diffuser outlets, with adjacent passages partitioned or separated by the vanes. The vanes are dimensioned and shaped such that the diffuser flow passages increase in cross-sectional flow area, moving from the inlets toward the outlets, to provide the desired diffusion functionality as compressed airflow is directed through the diffuser.

Diffusers are commonly utilized within gas turbine engines and other turbomachines containing impellers or other compressor rotors. A given diffuser may be positioned around a compressor impeller to receive the compressed airflow discharged therefrom. The airflow decelerates and static pressure increases as the airflow passes through the diffuser. The airflow may further be conditioned by other components, such as a deswirl section, contained in the gas turbine engine and located downstream of the diffuser. The deswirl section may itself contain a number of vanes that further condition the airflow prior to its delivery to the combustor. After deswirl, the air flow is delivered into the combustor, injected with a fuel mist, and ignited to generate combustive gasses.

Air may be bled from the compressor section for a variety of purposes. Bleeding air may lead to nonuniformity in the air flow leaving the compressor section as it is directed to the combustor. The operation of the combustor is a function of the airflow delivered to it. For example, the combustor preferably receives a consistent air flow rate as the compressor impeller rotates.

Accordingly, it is desirable to deliver uniform flow to a gas turbine engines combustor including in engines with bleed taken from the compressor's exit/diffuser area. It is also desirable to deliver uniform air to the combustor to enable a lower pattern factor at the turbine inlet. A lower pattern factor reduces the intensity of the hot streak entering the turbine and increases turbine durability. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

This summary is provided to describe select concepts in a simplified form that are further described in the Detailed Description section of this disclosure. This summary is not intended to identify key or essential features of the claimed subject matter, nor is it intended to be used as an aid in determining the scope of the claimed subject matter.

In a number of embodiments, a turbomachine includes a compressor, a combustor disposed to receive the compressed air from the compressor through a flow path, and a diffuser disposed in the flow path between the compressor and the combustor. A number of bleed holes are disposed downstream in the flow path from the diffuser and are configured to direct bleed air compressed by the compressor away from the combustor. The bleed holes have a plural number of sizes configured to provide uniform compressor exit flow distribution around a circumference of the diffuser.

In a number of additional embodiments, a turbomachine includes a compressor configured to compress air. A combustor is disposed to receive the compressed air from the compressor through a flow path. A diffuser is disposed in the flow path between the compressor and the combustor, and directs the air through the flow path. A deswirl section is disposed in the flow path between the diffuser and the combustor and receives the air directed by the diffuser. A bleed system is disposed to receive a feed air flow. A plenum is disposed between the bleed system and the flow path. A number of bleed holes are disposed downstream in the flow path from the diffuser and are configured to bleed the feed air flow, as compressed by the compressor, away from the combustor. The bleed holes are formed in a plural number of sizes and are configured to provide uniform compressor exit flow distribution around a circumference of the diffuser. The bleed holes provide the feed air flow to the plenum, where an amount of the feed air delivered to the plenum from each of the passages is approximately equal.

In a number of other embodiments, a turbomachine includes a compressor configured to compress air. A combustor is disposed to receive the compressed air from the compressor through a flow path. A diffuser is disposed in the flow path between the compressor and the combustor. Vanes are distributed circumferentially around the compressor with a flow passage defined between each adjacent two of the vanes. A cover defines a plenum. Bleed holes extend through the cover and are disposed to bleed air from a point downstream in the flow path from the diffuser, and are configured to direct the bleed air compressed by the compressor away from the combustor. The bleed holes have a plural number of sizes configured to provide uniform compressor exit flow distribution around a circumference of the diffuser and are disposed in the flow passages to provide a feed air flow to the plenum. An amount of the feed air delivered to the plenum from each of the passages is approximately equal.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In a number of embodiments, turbomachine compressor bleed is configured to avoid flow nonuniformity in the core flow directed to the combustor. Attaining a uniform exit flow condition, such as at the exit of deswirl, optimizes combustor performance and hot-section turbine component durability. The approach is adaptable to various diffuser bleed flow designs and is compatible with left-hand or right-hand engine bleed sources. Varying bleed hole diameters distributed circumferentially, substantially reduces unwanted effects on diffuser performance. In addition, the total area of the bleed holes minimizes disruption of the flow distribution and leads to an acceptable plenum pressure drop (e.g., <5 psid/34.5 kiloPascal), approximately, when the bleed flow is activated/initiated. The pattern factor of the combustor as a result of the resulting uniform bleed extraction is very small and acceptable, which may not otherwise be the case with nonuniform flow conditions.

In embodiments and examples described herein, applications such as turbomachines may be described in association with an aircraft gas turbine engine, but the disclosure is not limited in utility to such an application. In the example of a gas turbine engine with bleed from the diffuser area of a centrifugal compressor, the variation of bleed hole sizes offsets circumferentially distributed flow variations that may otherwise result from bleed draws. The embodiments disclosed herein have applicability where uniform flow downstream from bleed holes is similarly desirable. For example, various other engine environments, as well as different types of rotating or otherwise moving machinery will benefit from the features described herein. Thus, no particular feature or characteristic is constrained to an aircraft, or an aircraft engine, and the principles disclosed herein may be embodied in other vehicles, and/or in other turbomachinery or equipment.

Figure 1:
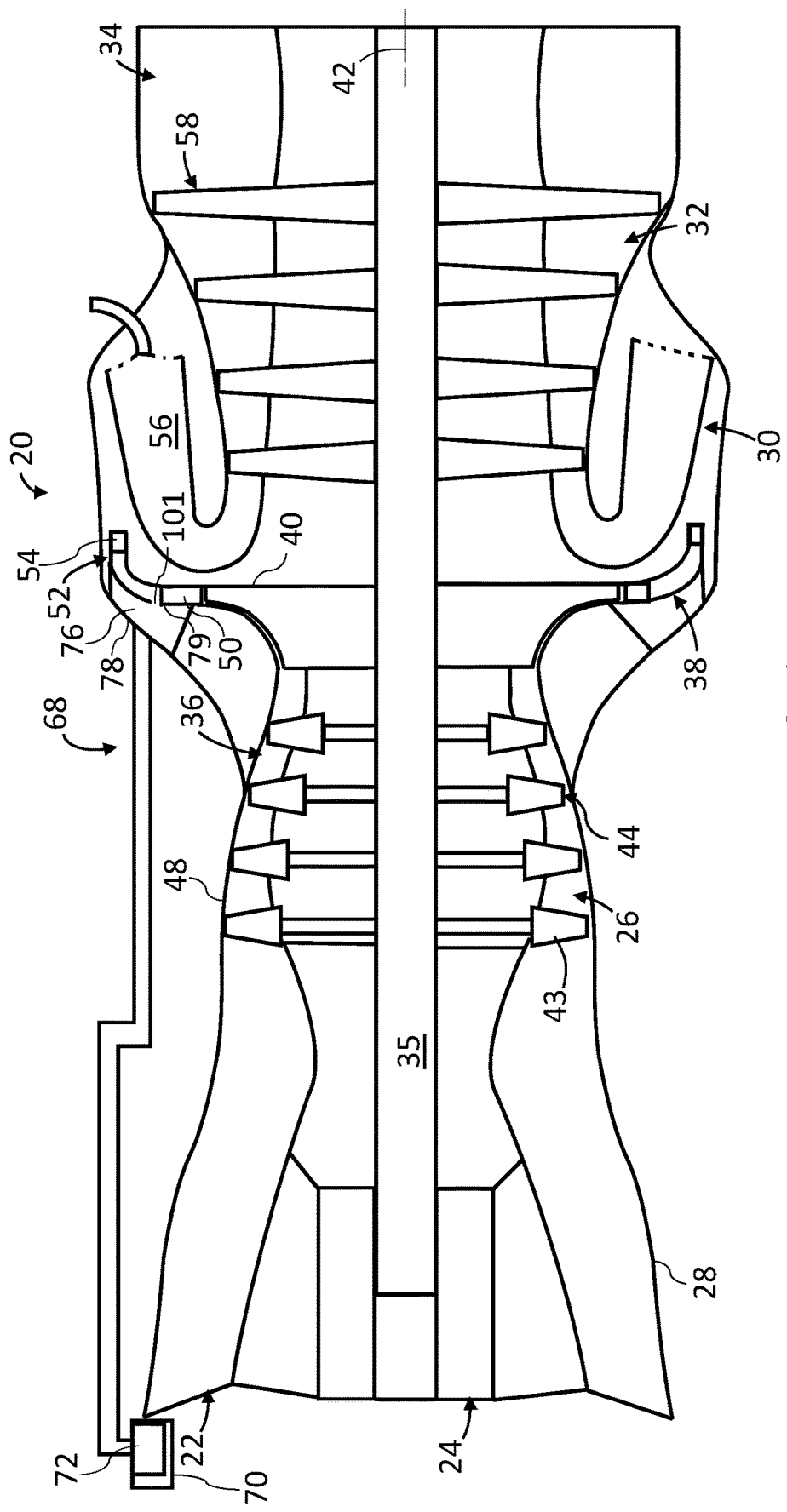
FIG. 1 is a schematic cross-sectional illustration of a turbomachine in the form of a gas turbine engine, according to an exemplary embodiment.

A schematic, partially sectioned view of an engine assembly 20 is shown in FIG. 1 according to an exemplary embodiment. The engine assembly 20 in general, includes an inlet section 22, a gearbox 24, a compressor section 26, a combustion section 30, a turbine section 32, a shaft 35, and an exhaust section 34, all of which may be disposed within, or defined by, a cowling 28 (with various internal shrouding not shown). The compressor section 26, the combustion section 30, the turbine section 32, and the exhaust section 34 may collectively be referred to as the engine core 36. During operation, air enters the inlet section 22 from atmosphere and is directed into the compressor section 26. The compressor section 26 may include one or more rotors or impellers or a series of compressor rotors and/or impellers that increase the pressure of the air, which is then directed toward the combustion section 30, such as through a diffuser 38. Air/gases generally flow through the core 36. Air directed out of the core 36 may be referred to as bleed. The engine assembly may include a number of additional components that are not illustrated for simplicity. For example, an inlet guide vane section may be located upstream of the compressor section 26.

Figure 2:
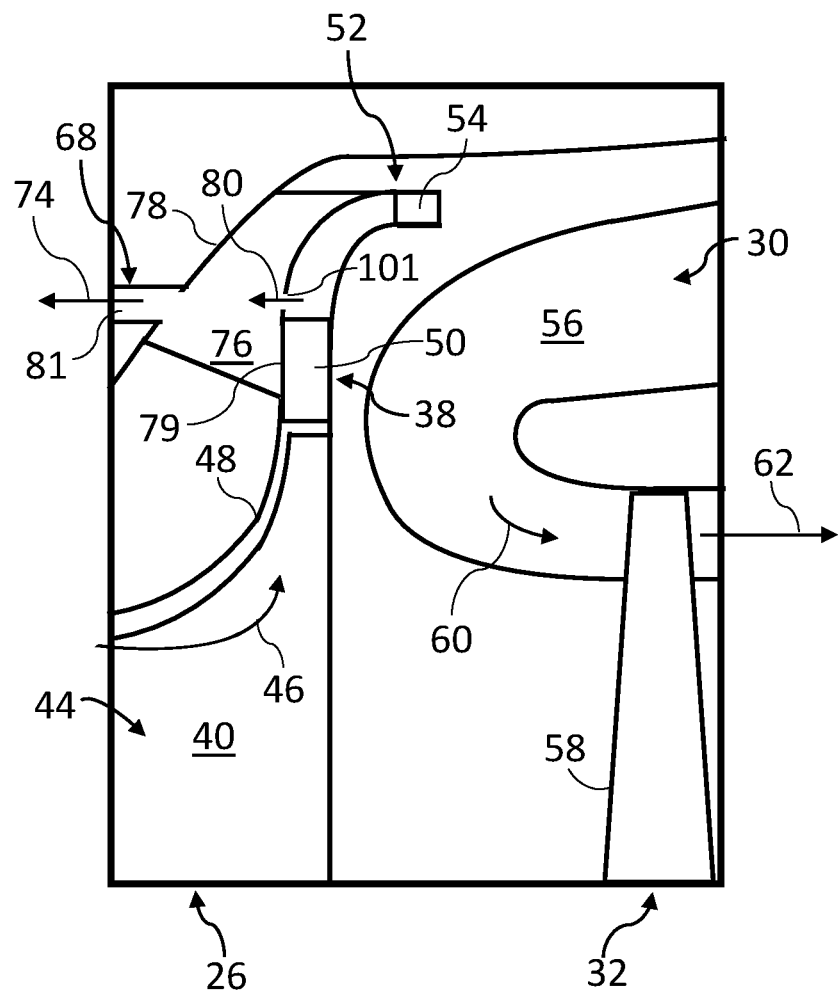
FIG. 2 is a schematic illustration of part of the engine of FIG. 1 showing air flow, according to an exemplary embodiment.

Referring additionally to FIG. 2 along with FIG. 1, the compressor section 26 includes a compressor 44 configured as an axi-centrifugal compression system with axial rotor(s) 43 with at least one centrifugal impeller 40 rotating about an axis 42. In other embodiments, any number of stages including a single stage may be employed. The impeller 40 rotates imparting a tangential velocity to the air 46 received from the inlet section 22 and a shroud 48 around the impeller 40 directs the air radially outward into the diffuser 38, which includes a number of circumferentially distributed diffuser vanes 50 (also illustrated in FIG. 4), defining flow passages of a flow path to the combustion section 30. The diffuser 38 directs the air through the flow path into a deswirl section 52. The deswirl section 52 includes another set of circumferentially distributed vanes 54 to straighten the flow leaving the compressor section 26 and directed through the flow path to the combustion section 30.

In the combustion section 30, the straightened high-pressure air from the compressor section 26 is mixed with fuel and combusted in a combustor 56. The gases from the combusted fuel and air are then directed into the turbine section 32. The turbine section 32 includes a rotor 58 with a series of turbines, which may be disposed in axial flow series or in other arrangements and which also rotate about the axis 42, which in this embodiment is a common axis 42 with the compressor 44. The combustion gas 60 from the combustion section 30 expands through, and rotates, the rotor 58 of the turbine section 32, from which power is derived. From the turbine section 32, the air/gas 62 is then exhausted from the engine core 36 through the exhaust section 34 to the atmosphere.

As shown in FIGS. 1 and 2, the engine assembly 20 includes a bleed system 68 with a number of loads for using the bleed air. In this embodiment, some of the air compressed by the compressor 44 is selectively directed to an inertial particle separator 70. The inertial particle separator 70 may be selectively operated on an intermittent basis when needed to remove particulate from the air 46 received at the inlet section 22. Also in this embodiment, some of the air compressed by the compressor 44 is selectively directed to an engine anti-ice system 72. The anti-ice system 72 may be located at positions such as upstream of the inlet section 22, in the inertial particle separator 70 or in the inlet guide vane section of the compressor 44. The engine anti-ice system 72 may be selectively operated on an intermittent basis when needed to prevent icing. In additional embodiments, other or additional systems may be included in the bleed system 68 that use bleed air from the compressor 44.

The bleed system 68 draws bleed air 74 from a plenum 76 through bleed port(s) including a bleed port 81 that is/are open to the plenum 76. The plenum 76 is defined by various components including a cover 78 and a wall 79. Feed air 80 is received into the plenum 76 through bleed holes (represented by bleed hole 101), through the wall 79. The bleed holes (e.g., bleed hole 101) extract the feed air 80 from the flow path in the diffuser exit region 88 (shown in FIG. 4), and may be located downstream from the diffuser vanes 50. The feed air 80 is extracted in the exit region 88, such as downstream of the throats of the passages 90 (shown in FIG. 4). In some embodiments, the feed air 80 may be extracted downstream of the deswirl section 52, with the bleed holes 101 et al. located downstream of the deswirl section 52, with the plenum 76 configured to receive the feed air 80. As such, the plenum 76 provides the bleed air 74 flow for selective draw by the inertial particle separator 70 and/or the anti-ice system 72, and/or other systems of the bleed system 68.

Figure 3:
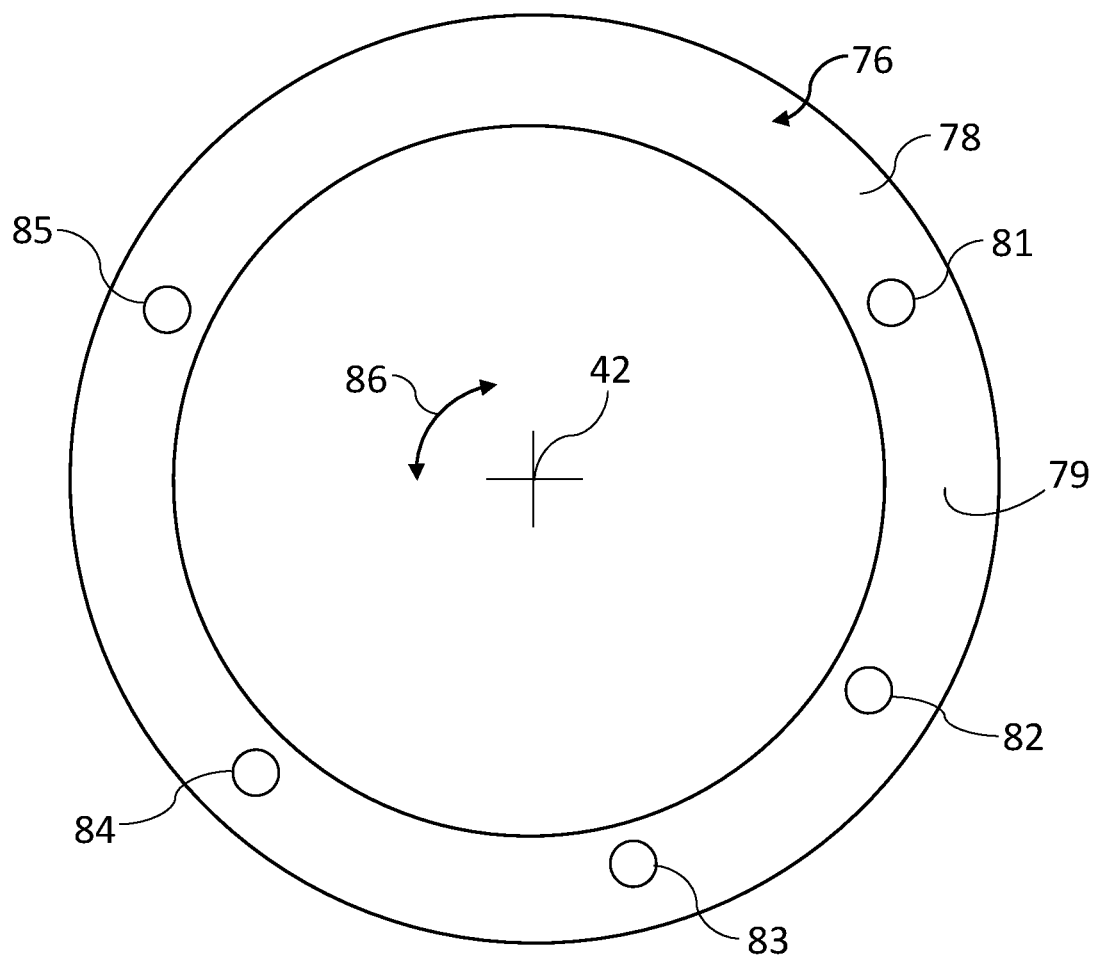
FIG. 3 is a fragmentary, axial cross-sectional illustration of a plenum bleed port area of the engine of FIG. 1, according to an exemplary embodiment.

Referring to FIG. 3, a schematic, axial cross section illustrates the location of the plenum 76 relative to the axis 42 and shows that it is annular in shape. The illustration shows the cover 78 as viewed in an axial direction from the inside of the plenum 76. The bleed port 81, along with bleed ports 82, 83, 84 and 85 are distributed circumferentially (in circumferential direction 86), around the plenum 76 and provide openings through the cover 78. The bleed ports 81-85 are irregularly spaced around the plenum 76. Accordingly, when the systems coupled with the bleed ports 81-85 selectively draw air through any number of the bleed ports 81-85, that air is extracted at certain locations around the circumference of the compressor section 26. In the current embodiment, the bleed ports 81-85 are defined to support both right-hand and left-hand positions of the engine assembly 20. As a result, the use of the bleed ports 81-85, and the amount of air they pull, may vary. For example when on one side of the associated aircraft, bleed port 81 may be connected with, and supply, the inertial particle separator 70, while when on the other side of the aircraft, bleed port 85 may be connected with, and supply, the inertial particle separator.

Each of the bleed ports 81-85 when active, may draw a different amount of air as compared to others of the bleed ports 81-85. In addition, the bleed ports 81-85 may not all be active simultaneously (and each may be intermittently activated), with some drawing bleed air 74 while others do not. When bleed air 74 is drawn, a resulting pressure drop may occur across the bleed holes 101 et al., in the area of the active bleed port(s) 81-85. Such a pressure drop would act to draw the feed air 80 through those of the bleed holes 101-150 (see FIG. 4), in the area of the active bleed port(s) 81-85. If not compensated for, this would result in the diffuser flow channels/passages at the radial location(s) of those bleed holes 101-150 delivering a different amount of core flow than other flow channels around the diffuser 38, which would supply nonuniform flow to the combustion section 30.

Figure 4:
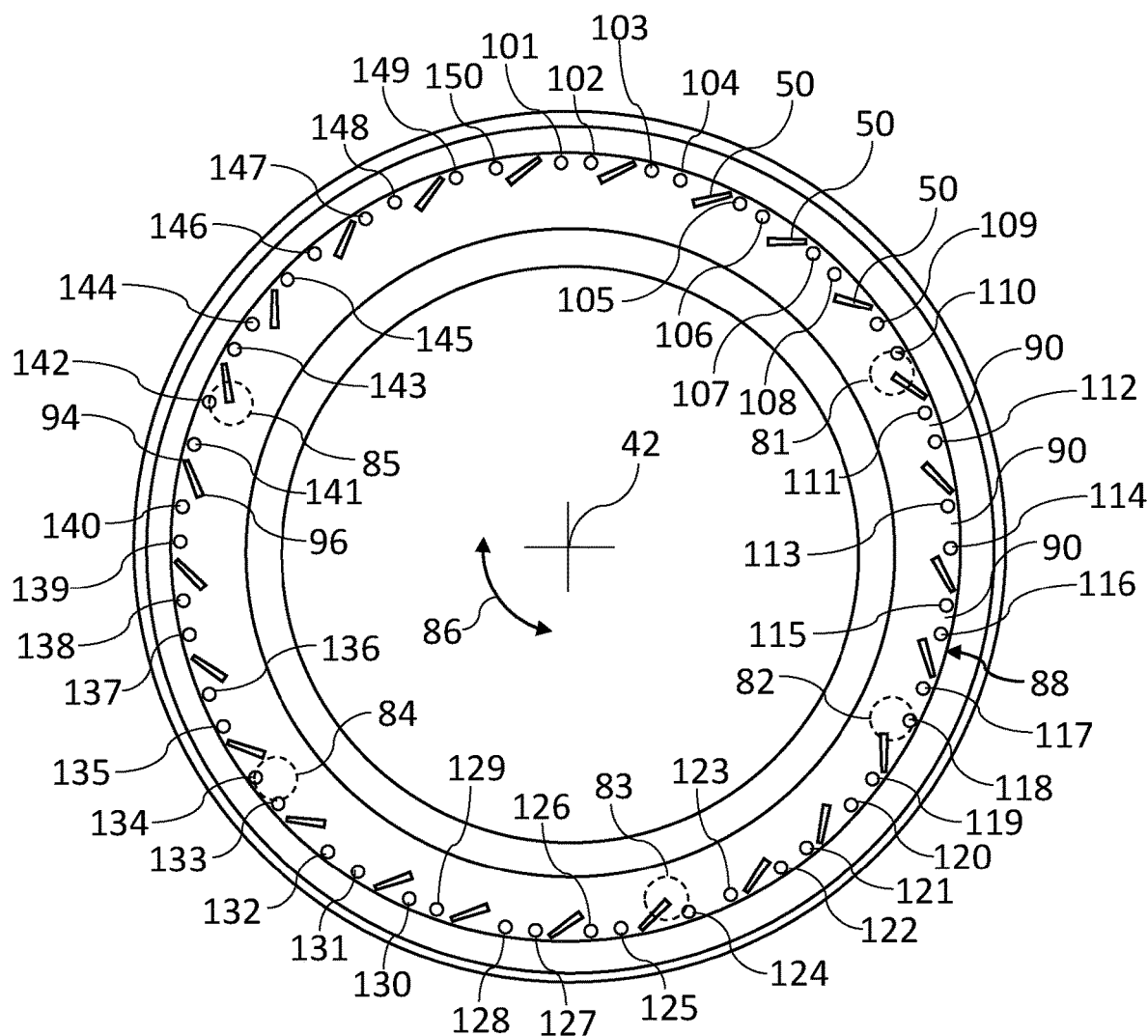
FIG. 4 is a fragmentary, axial cross-sectional illustration of a diffuser bleed hole area of FIG. 3 in a second state, according to an exemplary embodiment.

Referring to FIG. 4, a schematic cross section is shown through the area of the diffuser 38. The illustration shows the wall 79 and the bleed holes 101-150 as viewed in an axial direction from the inside of the diffuser 38. In this view the bleed ports 81-85 are located in the foreground relative to the plane of FIG. 4. As shown, the diffuser 38 includes the number of vanes 50 disposed around the circumference of the compressor section 26 radially outward from the impeller 40 (which itself includes a number of vanes that aren't illustrated). An exit region 88 of the diffuser 38 is an area where the air exits the diffuser 38 and includes the transition out of the diffuser 38. The vanes 50 define a number of flow passages 90 between each pair of adjacent vanes 50 through which flow from the impeller 40 is directed. In the current embodiment, the diffuser 38 includes twenty-five vanes 50 and twenty-five flow passages 90. In other embodiments a different number of passages 90 may be included.

The bleed holes 101-150 are distributed around the circumference of the compressor section 26. The bleed holes 101-150 are circumferentially distributed, in the circumferential direction 86, with spacings that may be the same or that may vary. FIG. 4 illustrates an embodiment showing the bleed holes 101-150 and their location with respect to diffuser exit region 88 in the depicted orientation. In embodiments, the exit region 88 may overlap the downstream ends 94 (at their radially outermost, trailing ends) of the vanes 50. The bleed holes 101-150 allow air to pass from the passages 90 into the plenum 76. In the current embodiment there are two of the bleed holes 101-150 in each one of the passages 90. In other embodiments, a different number of individual bleed holes 101-50 may be included in each of the passages 90. For example, one or more bleed holes 101-50 are included in each passage 90. In general, each passage 90 has at least one bleed hole and the total number of all bleed holes is a multiple (e.g., 1 times, 2 times, 3 times, . . . ) of the number of vanes 50. In addition, the bleed holes 101-150 are sized differently depending on where they are located relative to the bleed ports 81-85.

Figure 5:
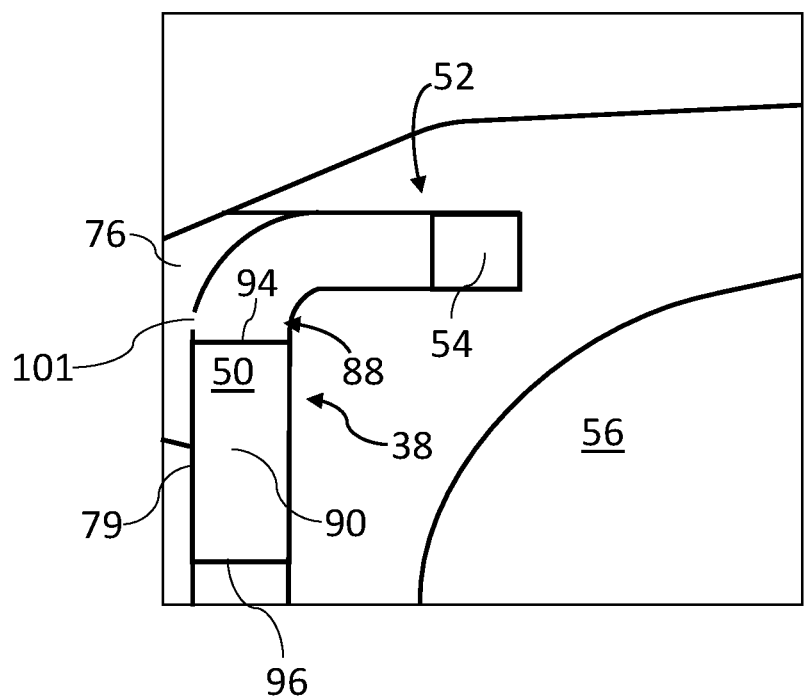
FIG. 5 is a fragmentary, meridional view of a diffuser and deswirl section of the engine of FIG. 1, according to an exemplary embodiment.

Referring additionally to FIG. 5, a meridional section is shown through one passage 90. In the current embodiment, the bleed holes 101-150 are located in the exit region 88 radially outward from the diffuser 38 and at the downstream (radially outward) ends 94 of the vanes 50 at the outlet from the passages 90 in the exit region 88 of the vanes 50. In embodiments, the bleed holes 101-150 are located closer to the downstream ends 94 than to the upstream ends 96. The bleed holes 101-150 are configured to minimize losses on the bleed side (the feed air 80, the plenum 76 and the bleed air 74), and to minimize the impact on the core flow side (flow to the combustor 56). In general, this is accomplished by forming the bleed holes 101-150 in a variety of different sizes with larger bleed holes 101-150 located further away from the circumferential locations of the bleed ports 81-85 and smaller bleed holes 101-150 located closer to the bleed ports 81-85, The result is that the flow through the passages 90 is consistent around the circumference of the deswirl section 52 and around the diffuser 38, and as delivered to the combustion section 30. The benefits also result from the radial location of the bleed holes 101-150 downstream in the exit region 88 of the diffuser 38 and upstream from or in the deswirl section 52.

In the current embodiment, the bleed holes 101-150 are formed in three different sizes (diameters). It should be appreciated that the size of the bleed holes 101-150, the number of different sizes included, and the specific bleed hole sizes and their locations are parameters determined for each specific application and will therefore vary between applications. The sizes are determined to result in bleed flow rates through different bleed holes 101-1:50 for a uniform exit flow condition at the exit of deswirl section 52. In general, those of the bleed holes 101-150 located closer to the circumferential position of a bleed port 81-85 are relatively larger, and those located further from the bleed ports 81-85 are relatively smaller. In spite of their different sizes, each of the bleed holes delivers substantially the same flow rate to the plenum 76. In one exemplary embodiment, the bleed holes 108-111 and 138-143 have diameters of 7.54 millimeters (19/64 inch); the bleed holes 101-107, 112-113, 130-137 and 144-150 have diameters of 8.33 millimeters (21/64 inch); and the bleed holes 114-129 have diameters of 9.52 millimeters (⅜ inch). As such, the sizes of the bleed holes 101-150 vary in a non-symmetrical pattern around the circumference of the compressor 44. The smallest of the bleed holes 108-111 are located in the vicinity of the bleed port 81, which, in this embodiment, has the highest bleed air 74 flow rate. In other embodiments for application of the engine system 20, the smallest of the bleed holes may be in the vicinity of another bleed port, such as bleed port 85. The largest of the bleed holes 114-129 are located in the area of bleed ports 82-83, which have the lowest bleed air 74 flow. The medium sized bleed holes 101-107, 112-113, 130-137 and 144-150 are located in circumferential positions as groupings between groupings of the largest bleed holes 114-129 and smallest bleed holes 108-111 and 138-143. The largest bleed holes 114-129 have an open area (71.18 square millimeters) that is 59% larger than the size of the open area (44.65 square millimeters) of the smallest bleed holes 108-111. The sizing of the bleed holes 101-150 at their various locations may be determined using computational fluid dynamics software knowing the physical dimensions of the compressor stage, the bleed air 74 flow rates through the bleed ports 81-85 and the output of the impeller 40. The result is that the flow rate through the passages 90 is uniform where each passage 90 has approximately the same flow rate around the circumference of the compressor section 26 so that non-uniformity in the flow to the combustion section 30 is avoided, even when bleed air 74 flow is active. Variation in the sizes of the bleed holes 101-150 minimizes disruption of the compressor exit flow distribution and the total bleed area allows an acceptable plenum 76 pressure drop when the bleeds are activated. For example, an acceptable/low pressure drop of less than 5 psid/34.5 kPa), approximately may occur.

Figure 6:
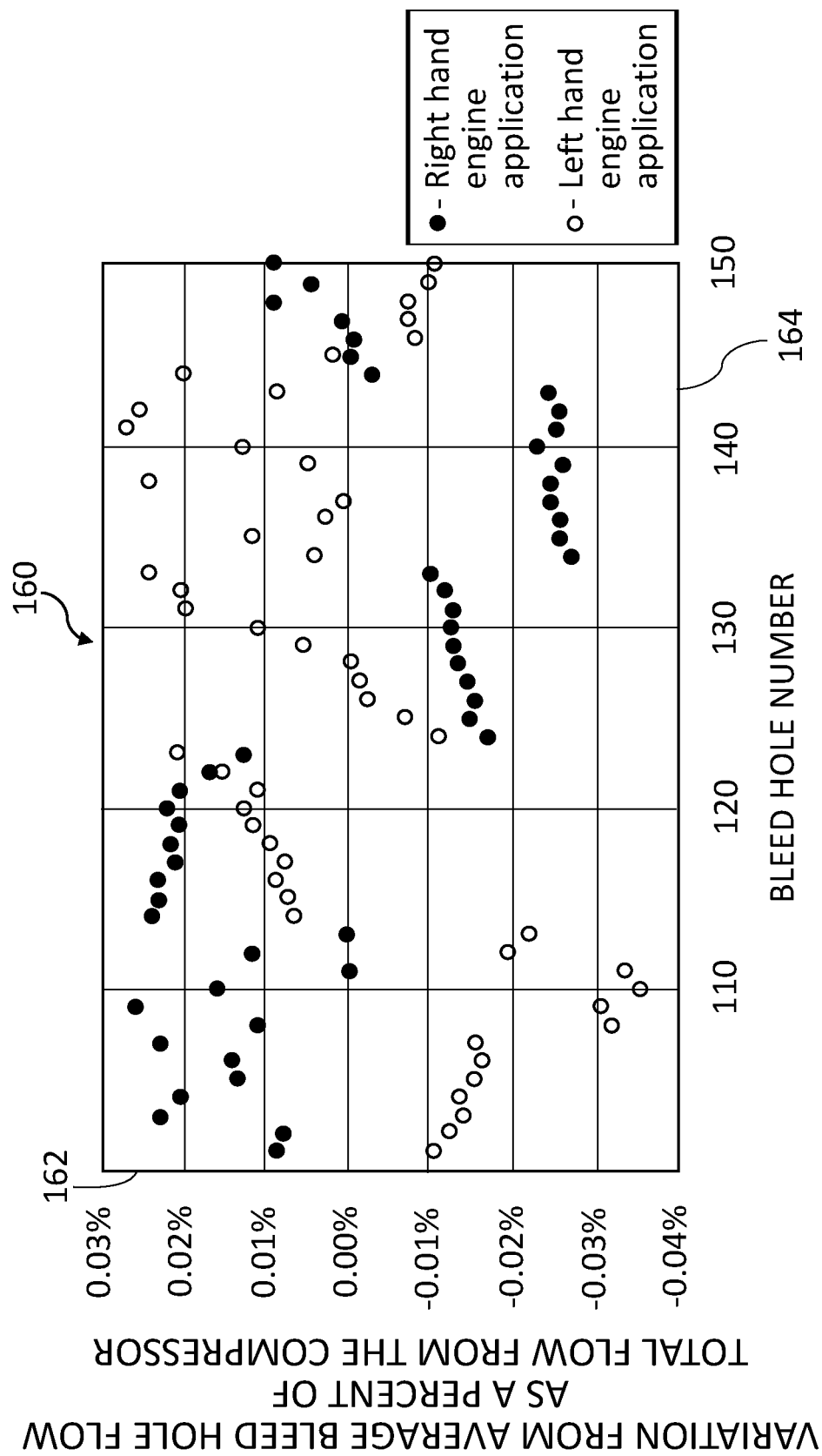
FIG. 6 is a graph demonstrating individual bleed hole flow as a deviation from average bleed hole flow normalizing the data as a percent of total flow from the compressor, according to an exemplary embodiment.

Referring to FIG. 6, a graph 160 shows deviation from average bleed hole flow normalizing the data as a percent of total flow from the compressor on the vertical axis 162 versus bleed hole number on the horizontal axis 164. In summary, the bleed holes 101-150 each have a flow that is approximately the same. The flow distribution is shown for each bleed hole 101-150 for both a right-hand application (by the solid dots), and a left-hand application (by the outline dots), of the engine assembly 20, The flow through each bleed hole 101-150 is represented by the dots as a data point for a percentage variance from the average bleed hole mass flow rate, relative to total flow exiting the compressor (e.g., bleed hole flow minus average bleed hole flow/total compressor flow). The flow through the various bleed holes 101-150 varies approximately ±0.03% of the total flow through the compressor 44 for either a right-hand application or a left-hand application. This minor variation results in uniform flow to the combustor 56 around the circumference of the diffuser 38/deswirl section 52. It also means that the amount of flow delivered through each of the bleed holes 101-1.50 and from each of the passages 90, is approximately equal.

Figure 7:
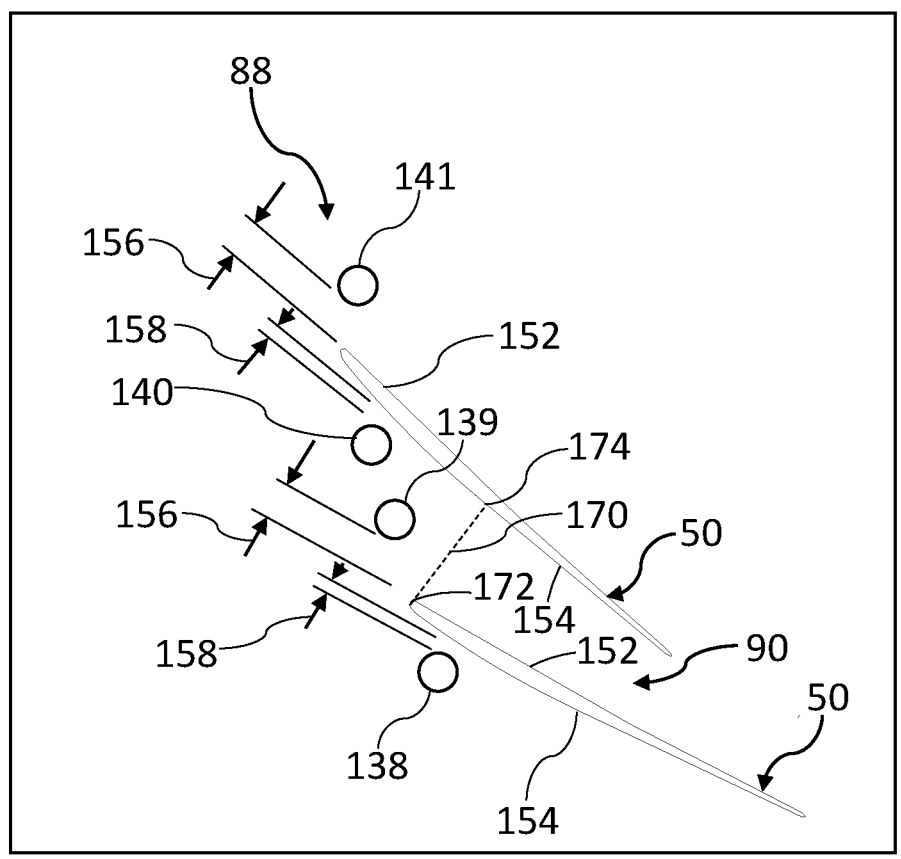
FIG. 7 is a schematic, sectional view through the diffuser exit region of the turbomachine of FIG. 1 showing bleed hole positioning relative to diffuser vanes.

Referring to FIG. 7, aspects of the diffuser 38 and its exit region 88 are schematically shown in cross-section showing the positioning of bleed holes 138-141 in the exit region 88. The exit region 88 begins, and extends downstream from a cover passage exit designated by a reference line 170 that extends across the passage 90 from a point 172 at the trailing end of one vane 50 to the closest point 174 on an adjacent vane 50. The bleed holes 138-141 are shown as representatives of the bleed holes 101-150. The vanes 50 each have a suction surface 152 and an opposite pressure surface 154. The bleed holes 101-150 are not evenly spaced circumferentially. As shown the pair 139 and 140 is offset toward one vane 50 versus the other. For example, the pair 139 and 140 may be located further away from the suction surface 152 and closer to the pressure surface 154 to reduce impact on centrifugal compressor performance and operability. In other embodiments depending on the specifics of the application, the pair 139 and 140 may be positioned differently. In this case, the distance 156 from the suction surface 152 to the bleed hole 140 is greater than the distance 158 from the pressure surface 154 to the bleed hole 139.

Accordingly, locating and sizing bleed holes results in minimized losses on the bleed side and minimized impact on the core flow side of a gas turbine engine with a centrifugal compressor. The bleed associated with each diffuser passage, downstream of the centrifugal compressor impeller, results in a uniform flow to the combustor at all circumferential positions. While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A turbomachine comprising:
   a compressor configured to generate compressed air;
   a combustor disposed to receive the compressed air from the compressor through a flow path; and
   a diffuser disposed in the flow path between the compressor and the combustor, the diffuser having an exit region,
   wherein a number of bleed holes are disposed in the flow path at the exit region of the diffuser and are configured to direct a portion of the compressed air as bleed air out of the diffuser and away from the combustor,
   wherein the number of bleed holes have a plural number of sizes configured to provide uniform compressor exit flow distribution around a circumference of the diffuser and minimize pressure drop when bleed flow is active.

2. The turbomachine of claim 1, wherein:
   the diffuser includes a number of vanes that each has a pressure surface and a suction surface,
   a flow passage is defined between each two of the vanes, and
   the bleed holes are unevenly spaced circumferentially and are disposed in the flow passages and are positioned closer to the pressure surfaces than to the suction surfaces.

3. The turbomachine of claim 1, wherein the diffuser includes a number of vanes with a flow passage defined between each pair of adjacent vanes, wherein the bleed holes are disposed in the flow passages.

4. The turbomachine of claim 1, comprising:
a bleed system with at least one load configured to draw the bleed air; and
a plenum disposed between the bleed system and the flow path,
wherein the bleed holes open to the plenum,
wherein the bleed system is coupled with the plenum at a bleed port disposed at a radial location around the circumference of the compressor,
wherein the bleed holes at the radial location are larger than others of the bleed holes.

5. The turbomachine of claim 1, wherein the compressor is a centrifugal compressor that has an impeller configured to generate air flow of the compressed air through the flow path.

6. The turbomachine of claim 1, comprising a deswirl section disposed in the flow path between the diffuser and the combustor, wherein the deswirl section includes vanes distributed circumferentially around the deswirl section.

7. The turbomachine of claim 1, comprising:
a bleed system with at least one load configured to draw the bleed air; and
a plenum disposed between the bleed system and the flow path,
wherein the bleed holes are configured, due to the size of the bleed holes, to result in a pressure drop that does not adversely impact operation of the bleed system, when the bleed system is activated.

8. The turbomachine of claim 1, comprising vanes distributed circumferentially around the diffuser with a flow passage defined between each adjacent two of the vanes, wherein the bleed holes are disposed downstream of the vanes.

9. The turbomachine of claim 1, wherein the flow path directs a core flow of the compressed air through the turbomachine, directing at least a portion of the core flow to the combustor, and comprising a cover defining the plenum, wherein the bleed holes extend through the cover in an axial direction and admit a feed flow into the plenum, wherein the feed flow is at least a portion of the core flow.

10. The turbomachine of claim 1, comprising vanes distributed circumferentially around the compressor with a flow passage defined between each adjacent two of the vanes, wherein the bleed holes are disposed in the flow passages, wherein the bleed holes are configured to provide a portion of the compressed air as a feed air flow to a plenum, wherein an amount of the feed air flow delivered to the plenum from each of the flow passages is approximately equal.

11. A turbomachine comprising:
a compressor configured to generate compressed air;
a combustor disposed to receive the compressed air from the compressor through a flow path;
a diffuser disposed in the flow path between the compressor and the combustor, the diffuser configured to direct the compressed air through the flow path;
a deswirl section disposed in the flow path between the diffuser and the combustor and configured to receive the compressed air directed by the diffuser;
a bleed system disposed to receive a portion of the compressed air as a feed air flow; and
a plenum disposed between the bleed system and the flow path,
wherein a number of bleed holes are disposed downstream in the flow path from the diffuser and are configured to direct the feed air flow away from the combustor,
wherein the number of bleed holes are formed in a plural number of sizes and are configured to provide a uniform compressor exit flow distribution around a circumference of the diffuser,
wherein the bleed holes are configured to provide the feed air flow to the plenum, where an amount of the feed air flow delivered to the plenum from each of the passages is approximately equal.

12. The turbomachine of claim 11, wherein:
wherein:
the diffuser includes a number of vanes that each has a pressure surface and a suction surface,
a flow passage is defined between each two of the vanes, and
the bleed holes are unevenly spaced circumferentially and are disposed in the flow passages and are positioned closer to the pressure surfaces than to the suction surfaces.

13. The turbomachine of claim 11, wherein the diffuser includes a number of vanes with a flow passage defined between each pair of adjacent vanes, wherein the flow passages define the flow path through the diffuser, wherein the bleed holes are disposed in the flow passages.

14. The turbomachine of claim 11, wherein:
the bleed system has at least one load configured to draw at least a portion of the feed air flow from the plenum,
the bleed holes open to the plenum,
the bleed system is coupled with the plenum at a bleed port disposed at a radial location around the circumference of the compressor, and
the bleed holes at the radial location are larger than others of the bleed holes.

15. The turbomachine of claim 11, wherein the compressor is a centrifugal compressor that has an impeller configured to generate the compressed air as air flow through the flow path.

16. The turbomachine of claim 11, wherein the diffuser includes vanes distributed circumferentially around the diffuser with a flow passage defined between each adjacent two of the vanes, wherein plural of the bleed holes are disposed in each one of a number of flow passages between the diffuser and the deswirl section.

17. The turbomachine of claim 11, wherein the bleed system includes at least one load configured to draw at least a portion of the feed air flow from the plenum, wherein the bleed holes are configured, due to the size of the bleed holes, to result in a pressure drop that does not adversely impact operation of the bleed system, when the bleed system is activated.

18. The turbomachine of claim 11, wherein the diffuser includes vanes distributed circumferentially around the diffuser with a flow passage defined between each adjacent two of the vanes, wherein the bleed holes are disposed downstream of the vanes.

19. The turbomachine of claim 11, wherein the flow path directs a core flow of the compressed air to the combustor, and comprising a cover defining the plenum, wherein bleed holes extend through the cover in an axial direction and admit a feed flow of the compressed air from the core flow into the plenum.

20. A turbomachine, comprising
a compressor configured to generate compressed air;
a combustor disposed to receive the compressed air from the compressor through a flow path;
a diffuser disposed in the flow path between the compressor and the combustor;
vanes distributed circumferentially around the compressor with a flow passage defined between each adjacent two of the vanes; and
a cover defining a plenum;
wherein a number of bleed holes extend through the cover and are disposed downstream in the flow path from the diffuser and are configured to direct a portion of the compressed air compressed by the compressor away from the combustor,
wherein the number of bleed holes have a plural number of sizes configured to provide uniform compressor exit flow distribution around a circumference of the diffuser,
wherein the bleed holes are disposed in the flow passages,
wherein the bleed holes are configured to provide a feed air flow of the compressed air to the plenum, and
wherein an amount of the feed air flow delivered to the plenum from each of the passages is approximately equal.

* * * * *